(No Model.) 2 Sheets—Sheet 1.

S. H. EVERETT.
FERTILIZER DISTRIBUTER.

No. 371,881. Patented Oct. 18, 1887.

ON LINE x—x

Attest:
Sidney P. Hollingsworth
N. R. Kennedy.

Inventor:
Samuel H. Everett
By his attorney
P. T. Dodge

N. PETERS. Photo-Lithographer, Washington, D. C.

(No Model.) 2 Sheets—Sheet 2.

S. H. EVERETT.
FERTILIZER DISTRIBUTER.

No. 371,881. Patented Oct. 18, 1887.

Attest:
Sidney P. Hollingsworth
A. R. Kennedy.

Inventor:
Samuel H. Everett,
By his Attorney
P. T. Dodge.

UNITED STATES PATENT OFFICE.

SAMUEL H. EVERETT, OF MACEDON, NEW YORK.

FERTILIZER-DISTRIBUTER.

SPECIFICATION forming part of Letters Patent No. 371,881, dated October 18, 1887.

Application filed July 15, 1887. Serial No. 244,399. (No model.)

*To all whom it may concern:*

Be it known that I, SAMUEL H. EVERETT, of Macedon, in the county of Wayne and State of New York, have invented certain Improvements in Fertilizer-Distributers, of which the following is a specification.

My invention relates to that class of feeders or distributers in which a hopper-bottom provided with a central delivery-opening is combined with an overlying rotary plate having a peripheral lip, which acts to draw the material inward beneath the plate and deliver it in a downward direction through the opening. These feeders as heretofore constructed are open to the objection that they require to be driven at a high rate of speed in order to deliver the requisite quantity of material and that the delivery is sometimes irregular.

It is the aim of my invention to overcome these objections and at the same time to lessen the cost of construction.

Figure 1:
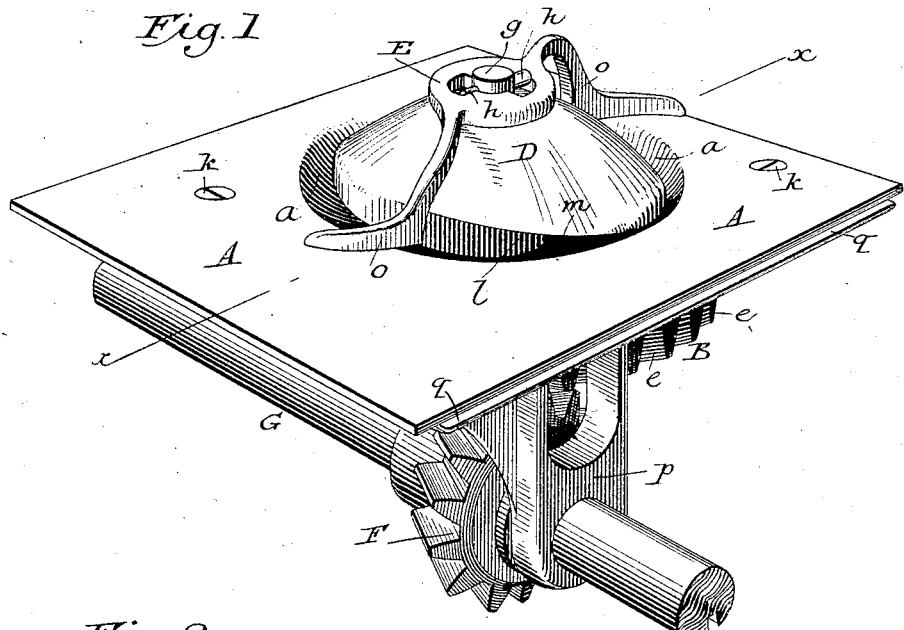
Figure 2:
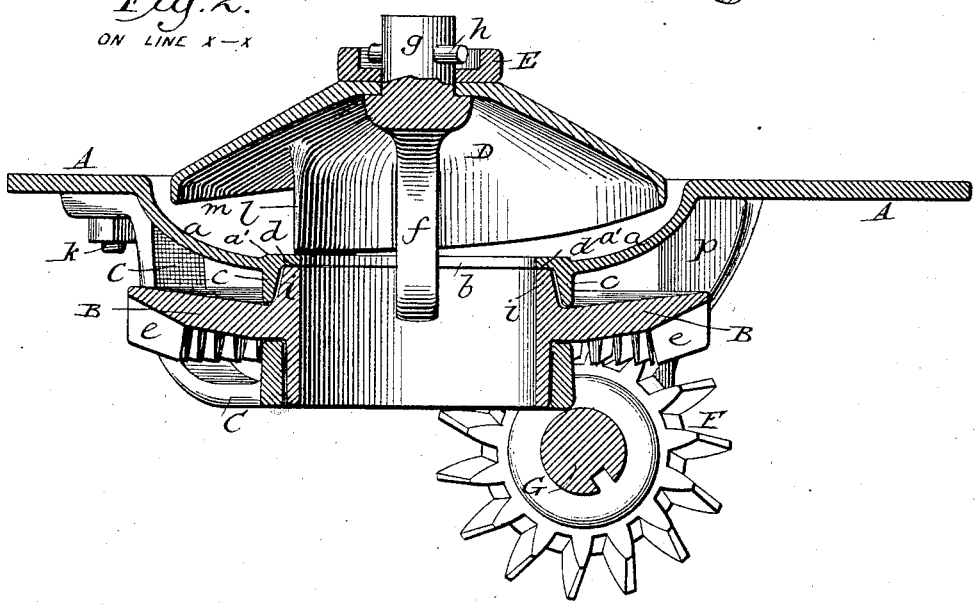
Figure 3:
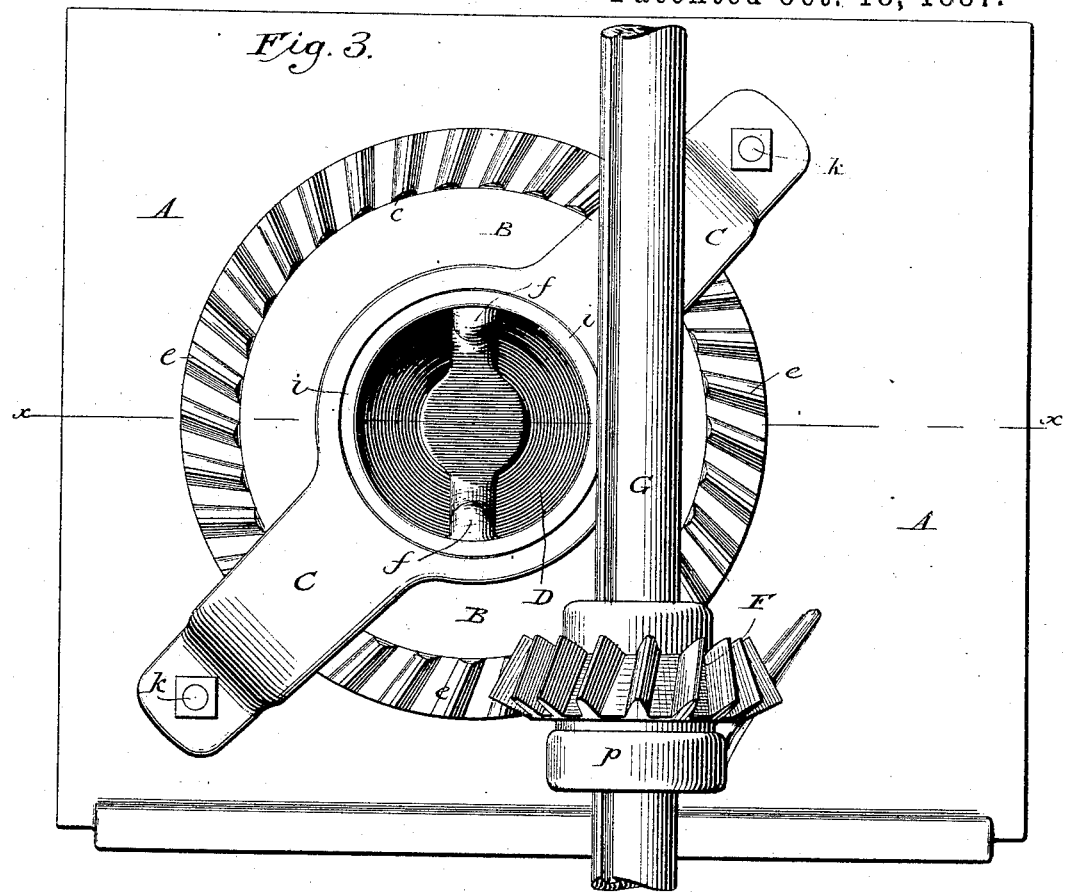
Figure 4:
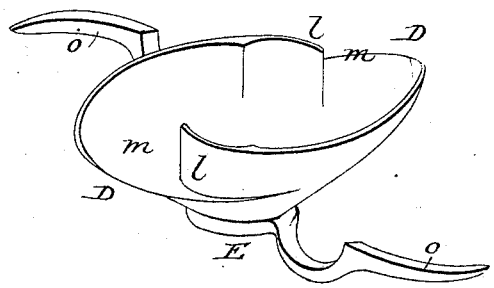
Figure 5:
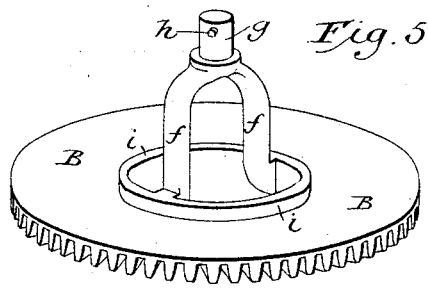
Figure 6:
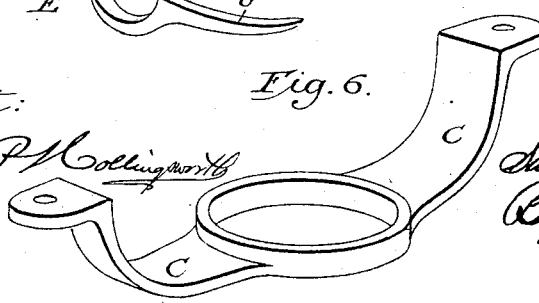

In the accompanying drawings, Figure 1 represents a perspective view of my improved feeder. Fig. 2 is a vertical cross-section of the same on the line $x\ x$. Fig. 3 is a bottom plan view. Fig. 4 is a perspective view of the feeder proper in an inverted position. Fig. 5 is a perspective view of the driving-wheel. Fig. 6 is a perspective view of the bracket by which the wheel is supported in position.

Referring to the drawings, A represents a metallic plate designed to serve as a portion of the bottom of a hopper containing the material to be distributed. The plate is preferably made, as shown, of rectangular form, with a flat margin and a central circular depression, $a$, sloping downward from all directions toward a central delivery-throat, $b$. This throat is surrounded by a depending neck or flange, $c$, with an inwardly-projecting lip, $d$, at the top, and an upwardly-projecting flange, $a'$, which may be formed in part by the said lip $d$.

B represents a wheel provided on its under face with marginal driving-teeth $e$, and formed at its middle with a central opening, and with an arched or elevated bar, $f$, which spans the opening and terminates at the top in a vertical neck, $g$, coincident with the axis of the wheel. This neck is provided with laterally-projecting studs $h$, or equivalent devices, for securing thereto the distributing device hereinafter described. The wheel is formed with a hub, $i$, adapted to revolve closely within the neck $c$ of the plate A, as shown in Fig. 2, and is retained in connection with the plate by means of an underlying arm or bracket, C, of the form shown in Fig. 6. This bracket is provided with a central opening to receive the hub on the under side of the wheel, and is turned over at its ends and secured by bolts $k$ or equivalent fastenings to the under side of the plate A. This arrangement holds the wheel securely in place beneath the plate, but permits it to rotate freely, at the same time affording a free unobstructed passage through the center of the plate and wheel for the discharge of the material. When the wheel is in position, its bar or post $f$ projects upward through the plate A in position to receive the plate D, forming the distributer proper. This plate is made concave on its under side, rising from its edges toward its middle, where it is supported and carried on the upper end of the post $f$ in order to revolve therewith within the recess $a$ of the plate A. The plate D is further supported by the flange $a'$, which forms a bearing on which the said plate revolves.

In the plan view the plate is on an elongated or oval form. It is constructed on opposite sides with two lips or flanges, $l$, which extend from the outer ends inward eccentrically to the edge of the central throat or delivery-opening. The edge of the plate is cut away vertically between the inner end of one lip $l$ and the outer end of the other lip in such manner as to leave at each end of the plate an opening, $m$, through which the material may pass thereunder within the lips $l$ into the opening.

I am aware that a delivery-plate having a single inlet-opening and a single lip resembling somewhat those herein shown is now known in the art. The essence of my invention in this regard consists in constructing the plate with two or more flanges and inlet-openings at different points in its circumference, so that the material may pass thereunder at two or more points simultaneously, in order to secure greater certainty and uniformity of action, as will hereinafter more fully appear.

The plate D is provided with shouldered notches adapted to interlock with the studs $h$ of the post $f$, whereby the plate is held down in place and compelled to revolve with the post.

In order to insure the delivery of the material inward to the distributer-plate D, I prefer to attach to said plate a cross-arm, E, secured thereto and terminating at its outer ends in two curved fingers or wipers, $o$, adapted to travel closely over the upper face of the plate A and deliver the material to the central recess, $a$, and the plate D therein.

For the purpose of imparting a continuous rotary motion to the wheel, the plate D, and the wiper E, I provide the pinion F, mounted on a shaft, G, and arranged to engage the wheel B, as shown. The teeth of this wheel are arranged in vertical lines oblique to the axis of the shaft after the fashion of what is commonly known as "skew-gear," and the teeth of the wheel B correspondingly formed. This admits of the shaft and pinion being set, as shown, to one side of the delivery-opening, out of the path of the descending material. The shaft is supported in an arm, $p$, cast on the under side of the plate A.

The plates may be supported and the shaft driven in any ordinary or suitable manner. In practice a number of plates are arranged side by side with their edges in contact, so as to form jointly the bottom of a hopper or feed-box, and the one shaft will be extended lengthwise of the machine to drive the device in series. In order to form a close joint at the junction of the plates A, I provide each plate at the end with a laterally-projecting lip, $q$, intended to underlie the edge of the adjacent plate.

The operation of my device is as follows: The continuous rotary motion being imparted to the shaft G, its pinion F revolves the wheel B, which in turn imparts a rotary motion to the distributer D and wiper E. The ends of the wiper, acting beneath the mass of material, draw the same inward, causing it to feed by gravity into the depression $a$. As the distributer D revolves, its lips $l$ act to deliver the material inward to the central opening, $b$, through which it is delivered in a downward direction. The material passes beneath the plate D from opposite sides. At the same time the two inflowing streams impinge against each other at the center in such manner as to insure a delivery at the middle and prevent the material from clogging or choking within the orifice. When two flanges and inlet-openings are employed, I find that a continuous delivery of the material is secured under all circumstances, and that the delivery is rendered practically uniform.

One of the chief advantages of the present construction lies in the fact that the machine may be used on a hillside or on rolling ground without affecting the rate of speed, and in this regard it is decidedly superior to that represented in my Letters Patent No. 357,376, dated February 8, 1887. It also avoids the necessity which exists in various other machines, of specially adjusting the distributer when the machine is used on the hillside.

Having thus described my invention, what I claim is—

1. In combination with a bed-plate or bottom, A, having a central delivery-opening, a horizontally-rotating distributer-plate overlying the same and provided with two eccentric lips, $l$, adapted to deliver the material thereunder through the central opening from opposite sides.

2. The plate having the central depression and delivery-opening, in combination with the rotary plate D, overlying said opening and provided with the two flanges $l$ and the wiper E, having its two ends extended beyond the path of plate D to deliver the material inward in advance of the respective lips.

3. The rotary feed-plate D, adapted to deliver the material beneath itself, in combination with plate A, having the central opening and the elevated flange around the same to sustain the feed-plate.

4. The plate A, with a central discharge-opening, in combination with an overlying rotary plate, D, the underlying wheel with the central opening and the arched post to carry the plate D, and the bracket C to sustain the wheel.

5. The horizontal wheel having a tubular hub, forming a delivery-opening for the material, in combination with a rotary feed-plate adapted to deliver the material laterally into the upper end of said opening in opposing streams, whereby the tendency of the material to lodge within the opening is prevented.

6. The plate A, provided with the delivery-opening, in combination with the feed-plate or distributer D, the underlying toothed wheel having a central opening, and the driving-pinion meshing directly with the wheel, the said pinion and its shaft being arranged out of line with the opening, whereby an unobstructed delivery of the material is permitted.

In testimony whereof I hereunto set my hand, this 5th day of July, 1887, in the presence of two attesting witnesses.

SAMUEL H. EVERETT.

Witnesses:
WILLIAM P. THISTLETHWAITE,
GEORGE W. KIRKPATRICK.